(12) United States Patent
Assadollahi

(10) Patent No.: US 9,104,783 B2
(45) Date of Patent: Aug. 11, 2015

(54) ASSOCIATION OF INFORMATION ENTITIES ALONG A TIME LINE

(75) Inventor: Ramin O. Assadollahi, Munich (DE)

(73) Assignee: ExB Asset Management GmbH, Munich (DE)

(*) Notice: Subject to any disclaimer, the term of this patent is extended or adjusted under 35 U.S.C. 154(b) by 549 days.

(21) Appl. No.: 13/578,088

(22) PCT Filed: Feb. 9, 2011

(86) PCT No.: PCT/EP2011/000594
§ 371 (c)(1),
(2), (4) Date: Nov. 5, 2012

(87) PCT Pub. No.: WO2011/098260
PCT Pub. Date: Aug. 18, 2011

(65) Prior Publication Data
US 2013/0074007 A1 Mar. 21, 2013

(30) Foreign Application Priority Data
Feb. 9, 2010 (EP) .................................... 10153109

(51) Int. Cl.
*G06F 3/0482* (2013.01)
*G06F 17/30* (2006.01)
*G06F 3/0486* (2013.01)

(52) U.S. Cl.
CPC ........ *G06F 17/30967* (2013.01); *G06F 3/0482* (2013.01); *G06F 3/0486* (2013.01)

(58) Field of Classification Search
CPC ......... G06F 3/00; G06F 3/048; G06F 3/0481; G06F 3/0482; G06F 3/04817; G06F 3/0486; G06F 3/04812; G06F 3/04842; G06F 3/04845; G06F 9/44543; H04N 5/44543; G11B 27/34
See application file for complete search history.

(56) References Cited

U.S. PATENT DOCUMENTS 5,977,974 A 11/1999 Hatori et al.
6,029,172 A * 2/2000 Jorna et al. ............................ 1/1
(Continued)

FOREIGN PATENT DOCUMENTS

| EP | 1 681 639 | 7/2006 |
|---|---|---|
| EP | 2 182 455 | 5/2010 |
| WO | WO 2010131900 | 11/2010 |

OTHER PUBLICATIONS

European Search Report 10153109.3-2201, mail date—Nov. 2, 2010, ExB Asset Management GmbH.
(Continued)

*Primary Examiner* — Xiomar L Bautista
(74) *Attorney, Agent, or Firm* — Saile Ackerman LLC; Stephen B. Ackerman

(57) ABSTRACT

The invention relates to the field of man-machine interfacing. In particular, it relates to a user interface allowing a unified approach for organizing and navigating data on a computing device, such as a work station, a desktop computer, a tablet PC, a laptop computer and/or a mobile device. A user interface method executed on a processor for displaying, on a screen, indicia for a set of entities along a time line represented by a linear indicia is described, wherein an entity of the set of entities is associated with a time instant on the time line. The method comprises the steps of: displaying on the screen a first indicia for a first entity associated with a first set of entities; displaying on the screen a second indicia for a second entity associated with a second set of entities; determining the distance on the screen between the first indicia and a set operation area associated with a set operation; determining the distance on the screen between the second indicia and the set operation area; determining a third set of entities based on the determined distances and based on the set operation performed on the first and second set of entities; and displaying on the screen indicia for the third set of entities along the time line at time instants associated with the third set of entities.

15 Claims, 4 Drawing Sheets

(56) References Cited

U.S. PATENT DOCUMENTS

| | | | |
|---|---|---|---|
| 6,925,608 | B1 | 8/2005 | Neale et al. |
| 8,713,002 | B1* | 4/2014 | Sahami et al. ................ 707/723 |
| 8,839,110 | B2* | 9/2014 | Wang et al. .................. 715/723 |
| 2005/0108234 | A1* | 5/2005 | Oksanen et al. .................. 707/9 |
| 2006/0156246 | A1* | 7/2006 | Williams et al. ............. 715/764 |
| 2007/0222768 | A1* | 9/2007 | Geurts et al. ................. 345/173 |
| 2009/0288044 | A1 | 11/2009 | Matthews et al. |
| 2010/0185984 | A1* | 7/2010 | Wright et al. ................ 715/833 |
| 2010/0241962 | A1* | 9/2010 | Peterson et al. ............. 715/720 |
| 2010/0250561 | A1* | 9/2010 | Nishiyama et al. ........... 707/754 |

OTHER PUBLICATIONS

"An Explortion of Multi-Finger Interaction on Multi-Touch Surfaces," by Shahzad Malik, XP-002660103, Doctoral Thesis, University of Toronto, pp. ii-xv and 1-169, Copyright by Shahzad Malik Sep. 2007.

Korean: Notice of Grounds for Rejection App No. 10-2012-7023169 Transmittal date: Dec. 23, 2013, ExB Asset Management GmbH.

* cited by examiner

ASSOCIATION OF INFORMATION ENTITIES ALONG A TIME LINE

The invention relates to the field of man-machine interfacing. In particular, it relates to a user interface allowing a unified approach for organizing and navigating data on a computing device, such as a work station, a desktop computer, a tablet PC, a laptop computer and/or a mobile device.

Retrieving information and navigating through information on a computer or a mobile device can be cumbersome. Not only has a user to learn the specifics of the interface of a certain application, i.e. the user interface concept, the window layout and the menu structure, but he also has to learn where within the application the intended information is stored, i.e. the organization of the information within the application and the data model. From a usability aspect the situation becomes even more complicated when the type of information which is manipulated is taken into account. By way of example, there are applications for organizing pictures, applications for organizing contacts, applications for organizing music and many other applications for manipulating many other types of informational entities. This means that the user has to learn and get accustomed to all of these user interfaces and their respective data models.

The present document addresses a core short coming of conventional computer systems where informational entities are represented in isolation and do not interact with each other. For example, an email program might contain all emails a user has. The email program allows the user to sort the emails according to different organising principles such as time, subject, sender and so forth. In a further example, a photo-organising program which is designed to work with photographs may allow for the tagging of pictures with certain keywords or the program may allow the display of pictures in folders that have to be organised by the user. As such, every program on a computer system has its own logic, folder structure and menus which are used to organize the data. Moreover, there are virtually no possibilities for these different programs to interact and to use data from one program to organise the informational entities of the other program.

Especially for consumer computers and mobile devices, it is clearly desirable to have one unified approach for organizing and navigating data in order to enhance the ease of use and to drive down the "mental costs" for a user to learn how to use the different applications on a system.

The present document addresses this issue by introducing a universal, application-independent set of categories that can be used across different application domains. According to an aspect, a representation of information along a common time line is introduced that is shared across different applications. Moreover, the different applications running on a computing device may comprise informational entities of different types which can be associated with one another. The common time line can then be used to perform complex information retrieval by rendering sub-sets and other set operations of associated informational entities.

According to an aspect, a method is described which is executed on a processor of a computing device for displaying on a screen a set of entities associated with an entity. Preferably, the method is executed on a computing device, such as a workstation, a desktop computer, a laptop or a tablet PC, or a handheld or wireless device, such as a mobile phone or a PDA. The method may be implemented as a user interface of the operating system of such a device. Preferably the screen is a touch-screen, such that a user may interact with the computing device using his finger or a pen. Other means of interaction may also comprise audio commands, e.g. via speech recognition.

The method may be used for displaying a set of entities associated with the entity, as well as for displaying the entity. Possible entities may be Contacts from a Contact Database; Places, such as cities or special places of interest, from a geographical database; Things, such as document files, picture files, music files and video files, from a File storage application, Web sites from a Web browser application or Emails from an Email application. In more general terms, the entities, which will also be referred to as informational entities or items, may be data units comprising a name tag for identification purposes and a plurality of content elements comprising additional information or attributes of the data unit. By way of example, an entity may be the Contact data unit in a Contact databank having a name tag which corresponds to the name of a person and a plurality of content elements or attributes such as the person's address, telephone number, Email address, etc.

It should be noted that typically the entities are represented on the screen by corresponding or related indicia. By way of example, a Contact entity could be represented by an indicia indicating the name tag of the entity, as well as an indication that the entity is a Contact data unit, or an Email could be represented by the image of a letter and an excerpt of the subject field of the particular Email message.

The user interface method may be used for displaying indicia for a set of entities along a time line represented by a linear indicia, wherein an entity of the set of entities is associated with a time instant on the time line. In particular, the linear indicia may represent a certain time interval with a certain time resolution, e.g. the months of a year, the weeks of a month, the days of a week or the hours of a day.

Typically, the set of entities which are to be represented along the time line are associated with a time instant. An email message may be associated with its sending date and time, a contact entity may be associated with the birthday of the person, a picture file may be associated with the date and time at which the picture was taken, etc.

The method may comprise the step of displaying on the screen a first indicia for a first entity associated with a first set of entities; and/or of displaying on the screen a second indicia for a second entity associated with a second set of entities. By way of example, the first and the second entity may be a universal category, e.g. "People", "Places" or "Things", and/or a sub-category, e.g. "Person", "Company" or "Countries", "Cities" or "Email", "Pictures", "Music", respectively.

The method may proceed in determining the distance on the screen between the first indicia and a set operation area associated with a set operation; and/or determining the distance on the screen between the second indicia and the set operation area. The distance between an indicia and the set operation area may be proportional to the geometric distance of the positions on the screen of the indicia of the entity and the set operation area. The set operation area is typically displayed on the screen and it is associated with set operations which may be applied to sets of entities. By way of example, the set operation area may be associated with a cut-set operation or an unification set operation. However, more complex set operations may also be implemented. The set operation area may correspond to a pre-defined area on the screen. This area may be represented by an indicia for the set operation area.

The method may further comprise the steps of determining a third set of entities based on the determined distances and based on the set operation performed on the first and second set of entities; and/or of displaying on the screen indicia for the third set of entities along the time line at time instants associated with the third set of entities. In an embodiment, the first set of entities is considered for the set operation if the distance on the screen between the first indicia and the set operation area is smaller than a threshold; and/or the second set of entities for the set operation is considered if the distance on the screen between the second indicia and the set operation area is smaller than the threshold. The threshold may specify a certain frame around the set operation area. By way of example, the threshold may be zero.

The third set of entities may be determined by performing the set operation on the considered sets of entities. I.e. if the first and the second entities are considered then the set operation is performed on the first and the second entities and their associated sets of entities. By way of example, if the set operation area is associated with a cut-set operation, the step of determining the third set of entities may comprise the step of selecting the first entity as an activated entity and the step of selecting the second entity as an influencing entity. In general, the entities to be displayed are selected from the set of entities associated with the activated entity, whereas the set of entities associated with the influencing entity are used to confine the set of entities which is to be displayed. Consequently, the step of determining the third set of entities may further comprise the step of determining an entity of the third set of entities as an entity of the first set of entities which is associated with an entity of the second set of entities.

According to a further aspect, the method may comprise the step of displaying on the screen a fourth indicia for a fourth entity associated with a fourth set of entities; and/or the step of determining the distance on the screen between the fourth indicia and a multiple thread area associated with the linear indicia. The multiple thread area is typically configured to display a new thread of entities along the time line. By way of example, the multiple thread area may be positioned below a currently displayed thread. Notably, if the distance between the fourth indicia and the multiple thread area is below a certain threshold, the method may proceed in displaying on the screen indicia for the fourth set of entities along the time line at time instants associated with the fourth set of entities. These indicia for the fourth set of entities may be displayed in a separate time line thread than the indicia for the third set of entities. In addition, the separate time line thread may be associated with a separate set operation area, thereby enabling separate set operations on the different displayed time line threads.

According to an aspect, the method may comprise the step of receiving a command for rendering the third set of entities; and/or the step of sequentially rendering the entities of the third set of entities along the time line. By way of example, if the content of an entity of the third set of entities is viewable (e.g. an email, a picture file, a document), the rendering may comprise displaying the content of the entity for a certain time period. If the content of an entity of the third set of entities is audible (e.g. a music file), the rendering may comprise playing back the content of the entity. As such, the method may implement a generic entity player which plays the entities shown along a time line thread. The different player settings, e.g. play, stop, rewind, fast forward, pause, may be displayed as clickable icons together with the time line thread.

According to an aspect a user interface as such, or a user interface within a computing device, or the computing device, for displaying indicia for a set of entities along a time line represented by a linear indicia is described. Typically, an entity of the set of entities is associated with a time instant on the time line. The interface may comprise a screen for displaying a first indicia for a first entity associated with a first set of entities; and/or for displaying a second indicia for a second entity associated with a second set of entities. Furthermore, the interface may comprise processing means for determining the distance on the screen between the first indicia and a set operation area associated with a set operation; and/or for determining the distance on the screen between the second indicia and the set operation area; and/or for determining a third set of entities based on the determined distances and based on the set operation performed on the first and second set of entities. The screen may be further configured for displaying on the screen indicia for the third set of entities along the time line at time instants associated with the third set of entities.

The computing device may further comprise a storage unit for storing the entities, wherein an entity is at least one of contacts from a contact databank, places from a geographical databank, files from a file storage application, web sites from a web-browser application or emails from an Email application. The computing device may further comprise an application module, wherein a function is applied on a selected entity by passing the entity to the application module.

The objects and features of the invention will become apparent from the following description of preferred embodiments. The present invention is described in the following by referring to exemplary embodiments illustrated schematically in the accompanying figures, wherein FIG. 1 illustrates an indicia displayed on a computing device;

According to an aspect of the present invention, data is organized in a way that reduces the complexity of data structures and facilitates the navigation through the data, while departing from the conventional concepts of file explorers, contacts databases and music players. The organization and navigation is therefore holistic and not constrained to one specific form of data, such as pictures, music, emails or contacts.

It is, however, useful to illustrate the organization and navigation principle of the invention on the basis of a set of exemplary use cases or scenarios. In the following, the invention is described in the context of a contacts or address book scenario. In particular, it is described, how a user would access a contact list that is organized according to the principles of the present invention.

In one embodiment, a contact indicia or icon is presented to a user. In the following FIGS. 1 to 5 such a contact indicia is represented as reference signs 100, 200, 300, 400, 500, respectively. The contact indicia could be presented to the user on a computer screen, a touch screen, a head-up display, a mobile phone screen and the like. As mentioned before, the example illustrated in FIGS. 1 to 5 is only an example for contact folders and their specific data but should not be understood as a limitation to the general concept and the resulting method and system of the invention. In general terms, the contact indicia should therefore be understood as an indicia associated with any kind of informational entity.

Figure 1:
Figure 2:
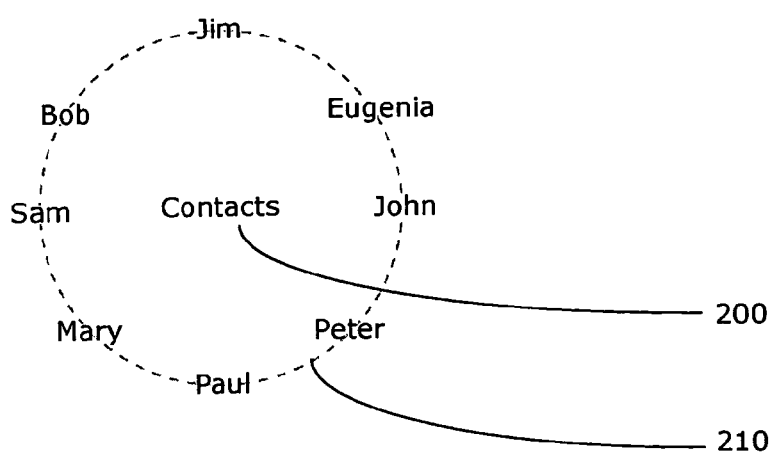
FIG. 2 illustrates a set of further information entities associated with the indicia of FIG. 1.
Figure 3:
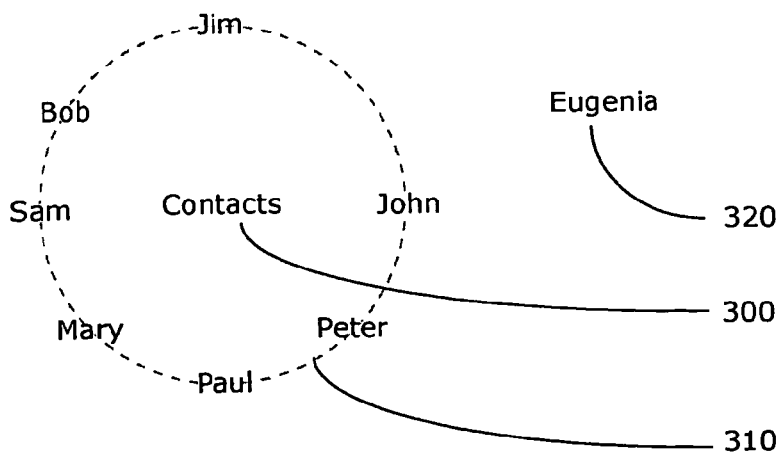
FIG. 3 illustrates the selection of an influencing information entity.

As shown in FIG. 2, if the user activates the informational entity 200, e.g. by pressing a mouse button, or by touching the information entity 200 with a pen or finger on a touch screen, the top N, i.e. eight in FIG. 2, associated informational entities 210 are shown. Alternatively or in addition, voice input or speech recognition may be used to activate individual entities. The activated informational entity 200 is also referred to as the activated entity. In the present example, this set of associated informational entities 210 may be the set of contacts that the user works with most frequently. It should be noted that the number of associated informational entities displayed to the user may vary. Furthermore, the representation and the ordering of the associated informational entities may follow a plurality of design rules. By way of example, the set of associated informational entities may be presented in a vertical or horizontal list or it may—as shown by the dotted line in FIG. 2—be presented in a ring, on which the associated informational entities are presented in a clockwise order. In the following, the term "lists" is to be understood to comprise all these types of representations. Furthermore, the representation of the set of informational entities may depend on their frequency of use, such that e.g. the one o'clock position on the ring indicates the most frequent entity, while the twelve o'clock position indicates the eighth most frequent entity. Clearly such sorting or ordering may be provided for all types of lists. In general, such lists will be referred to as ordered lists.

In a next step, the user may select and extract one of the associated informational entities from the displayed list, e.g. in order to work with a particular selected entity. In the present example shown in FIG. 3, the entity named "Eugenia", represented by reference sign 320, has been dragged out of the circular presentation 310 of the top eight contacts 300. As exemplary use case, the user may use the selected contact entity 320 to get access to the detailed contact information of the contact entity 320 or to use the contact entity 320 to make a telephone call, to write an email or to send a short message to the person associated with the entity 320. In general terms, a certain function or action may be applied to or associated with a selected contact entity 320. Other examples of such functions may comprise the playing of a selected music file, the display of a selected picture or movie, the deletion or modification of the data associated with the entity, etc.

Figure 4:
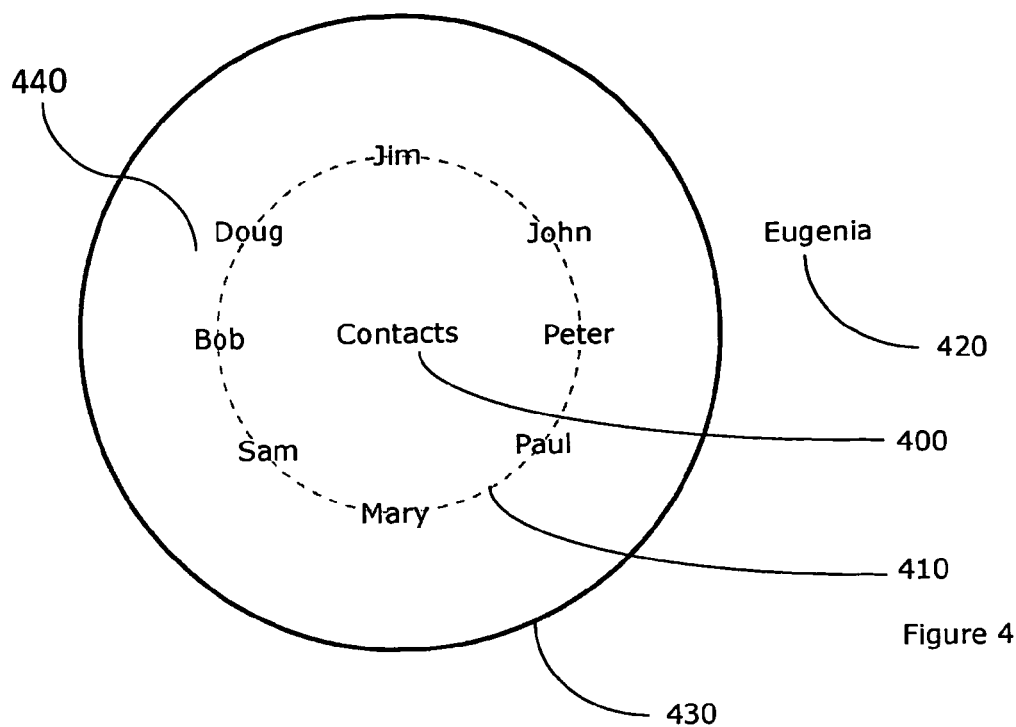
FIG. 4 illustrates the impact of an influencing information entity at a distance greater than a pre-defined threshold value.

Reference is now made to FIG. 4. According to an aspect, the distance between the selected entity 420 that was dragged out of the circular representation 410 of the displayed informational entities and the activated informational entity 400 plays a role for the retrieval of further informational entities. By way of example, there may be a threshold distance that triggers the influence of the distance. In such cases, an interaction between the dragged entity 420, which is also referred to as the influencing entity, and the activated entity 400 may only occur, when the distance between both of them is short enough. Such a threshold may be presented to the user as a circle 430 on the display that is visible while an informational entity 420 is dragged from the circle 410. In general terms, an indication of the threshold area surrounding an activated entity may be visible when moving an influencing entity within the vicinity of the borders of the threshold area or within the vicinity of the complete threshold area.

Figure 5:
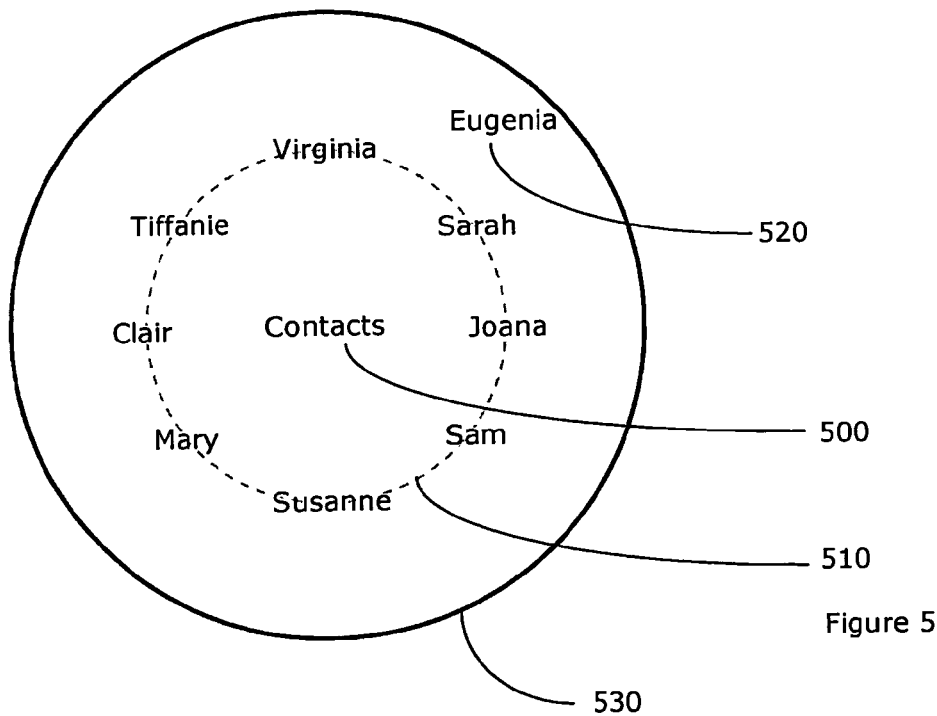
FIG. 5 illustrates the impact of an influencing information entity at a distance smaller than a pre-defined threshold value.

FIG. 5 illustrates an example, where the dragged out entity 520 is positioned within the threshold circle 530. This event may trigger the interaction between the activated entity 500 and the dragged entity 520. If the user activates the entity 500, e.g. by shortly pressing on the indicia of the entity 500, then associated entities of the dragged out entity 520 may influence the set of informational entities and their ordering displayed in relation with contact indicia 500. By way of example, the modified set of informational entities 510 displayed on the screen may be an ordered list of contacts that are known to "Eugenia", i.e. to the entity 520. If a different entity 520 had been dragged out and placed within the circle 530 then the list 510 would possibly look different, indicating other contacts that are associated with the activated entity 520.

It should also be noted that more than one entity 520 may be dragged out of the set of informational entities 510 and positioned within the circle 530. In such cases, all these entities may influence the set of entities and their ranking displayed in the ordered list 510.

Furthermore, the threshold may be replaced or complemented by a distance dependent influence of dragged out entity or entities 520 on the list 510 of the activated entity 500. In such cases, entities that are farther away from the activated entity 500 would have less influence on the displayed list 510 than entities that are nearby the entity 500.

In other words, the interaction between the associated lists of two informational entities is taken into account. This is illustrated in FIG. 5, where the interaction between the two informational entities 500 and 520 influences the displayed list of entities 510. According to this aspect, the ordering of a presented list may change if there is a second informational entity nearby. For example, the informational entities 500 and 520 may be presented on a computer screen and the physical or geometrical distance between these two entities, i.e. the physical distance between the indicia representing these two entities, may influence the presentation of the ordered list 510 of one of these entities. The distance may be measured as the distance on the screen between the coordinates of the indicia representing the two entities. Alternatively, the distance between two indicia may be defined by the number of pixels between them.

One form of interaction between two informational entities X and Y, e.g. reference signs 500 and 520 in FIG. 5, may be that the cut-set of their two associated lists is generated. By way of example, entity X may have a list of associated entities A, B and C, whereas entity Y has a list of associated entities B, C and D. When both entities X and Y are displayed on the screen and one of the entities is activated by the user then the device would show only the associated items B and C, as only these items are in the cut-set of the entities X and Y. It should be noted that depending on the embodiment such interaction between the entities X and Y may only occur if the distance between both entities is below a pre-defined threshold level, as e.g. defined by the circle 530 in FIG. 5. Furthermore, it should be noted that other forms of interaction may be considered, such as the generation of a union-set of the associated entities.

It is also noteworthy that the influence of the distance of an influencing entity to an activated entity may not only be linear in nature but could take different forms such as the square of the distance. In one example, the influence of an influencing entity may decrease proportional to one over its square distance to the activated entity. Furthermore, the distance dependent influence may be subject to a threshold. By way of example, there may be a defined distance between an influencing entity and an activated entity below which the influence of the distance could be proportional to the distance and above which the influence may be zero. Alternatively, the influence below the threshold may be fixed, e.g. at a value of 1.0, regardless of the distance. The use of a threshold above which an influencing entity has no more influence on the list of associated entities of an activated entity would allow for multiple activated entities to be displayed on the screen, which would not interact with one another if they have a long enough distance between them.

Figure 6:
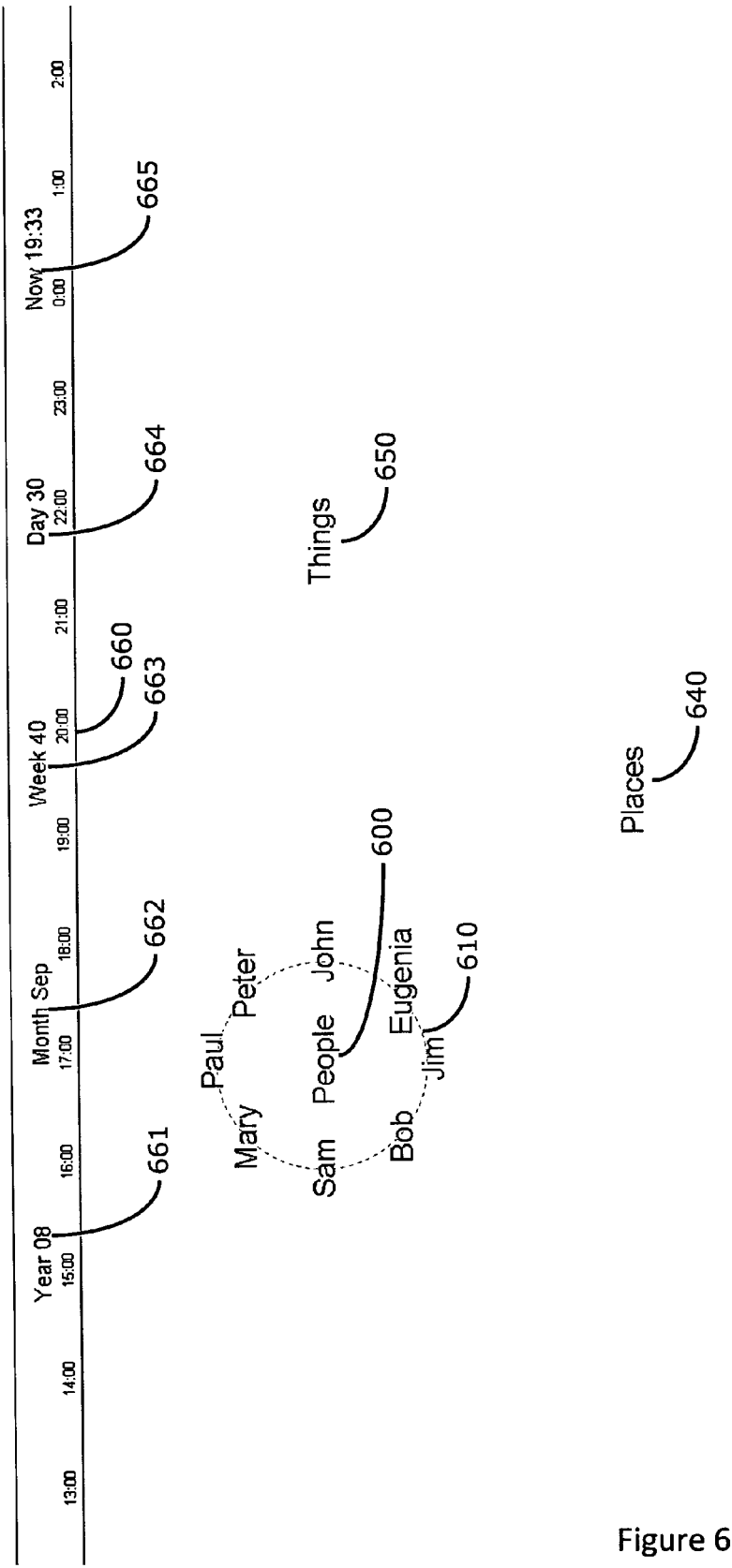
FIG. 6 illustrates an example of a user interface using the methods described in this document.

Reference is now made to FIG. 6. In the illustrated embodiment, user data is stored in four universal categories, i.e. Time 660, People 600, Things 650 and Places 640. All of these categories, which are implemented as informational entities, may reveal their associated data at the touch of a finger or at the mouse-click of a user. In the illustrated example, the "Time" category 660 is represented at a time bar, on which time dependent events, such as meetings, arrivals of emails, music and so forth, would be arranged and displayed. It should be noted that this presentation is only one possible way of representation and that associated informational entities may be presented in various different ways. The synergies of such a unique presentation of a time bar, on which various time-dependent entities of potentially different categories may be shown, arises from the fact that only one time line is available and required for the whole system. Preferably, there is no play-list for the music player, no calendar for the appointment application, no email list for the email application and so forth.

Not only can the user put events on the time line, the user can also drag dates from the time line to constrain the selection of data in the other categories. By doing so, a specific date or a certain interval of time may become an influencing entity for another activated entity. It should also be noted that the time line may be organized using different resolutions so that the user can switch between "days" 664, "weeks" 663, "months" 662, "years" 661 and so forth. Furthermore, by clicking the entity "now" 665, the user may be enabled to set the time ray to the current date and time.

FIG. 6 shows a further category "People" 600, which could comprise all information about the contacts that are known to the user. Such contacts may be organizations such as companies, hotels, restaurants and so forth, as well as people known to the device user. In other words, the entity "People" 600 could comprise a list of associated entities representing contact data. The illustrated user interface would allow a user to not only drag out one specific person from the list of associated entities and view the other people associated with this person, but it would also allow a user to drag out, i.e. extract, an entity representing a company name and view all the people working for this company as a list of associated entities. Furthermore, the user could drag an entity representing a person onto a specific time instance on the time bar 660, in order to obtain a list of associated entities having a relation with both the selected person and the selected time instance.

In addition, FIG. 6 shows a "Things" category 650, which could comprise all sorts of data that a user stores, such as emails, pictures and music. Similar to the other categories, also the "Things" category 650 is an informational entity that may have further associations, i.e. further associated entities, which appear on a screen, if selected by a user. By way of example, clicking on the entity "Things" 650 may trigger the display of a list of associated entities, such as emails, videos, music, pictures, websites. These associated entities may again each comprise a list of associated entities and so forth. At any time, the dragging of an influencing entity into the proximity of such an activated entity will influence the extent, the content and/or the representation of the list of associated entities.

Finally, FIG. 6 also shows a "Places" category 640, which could be associated with the information regarding the places that are known to the user, such as the contact's addresses, the cities that were visited by the user or that were cited in emails or even websites that the user has viewed. Using the methods described in the present document, the user could easily find out what people live in a particular city, by bringing an entity associated with the particular city into the vicinity of the activated "People" entity 600. The people having a certain relation to that particular city would then be displayed as a list of associated entities 610. As another example, the user could also use the entity related to the particular city to retrieve pictures from the "Things" category 650 which were taken in this city. This is particularly useful if the pictures were taken using a GPS (global positioning system) enabled camera and contain longitude and latitude information of the location that the picture where taken at.

It should be noted that all of these universal categories 600, 640, 650 and 660 could also have sub-categories associated with them so that emails could be organized in sub-categories and music files could be organized according to genres, artists and album titles.

In the following, exemplary use cases are described that reveal the synergetic benefits of the present invention:

In an example, the user generates a new event, i.e. a new entity, "Party" on Sunday, the 12th of October 2008, 20:00-24:00 o'clock on the time ray 660. He may invite a couple of people by dragging them from the "People" category 600 and associating them with that event. When the event actually occurs, the user may use the same device to play music on the party by dragging some music albums from the "Things" category 650 to the time line where they will be played at that particular time. As a result of this association, the system will not only know which people were invited to the particular party and associate these people with one another. The system will also know that these people listened to the particular set of songs by associating the people with the music. Due to this information and the effected associations, the user could retrieve people in the future, who know each other, i.e. people that are associated with one another. Furthermore, he could also retrieve the music associated with those people.

In a further example, the activated entity "Pictures" could be dragged to the time line 660 in order to reveal the pictures sorted by time. If, in addition, the entity associated with a particular person is dragged to the time line 660, then only those pictures associated to that person are shown. Such association between the pictures and a particular person could be established based on the home address of the person, e.g. by associating the GPS data of the pictures with the GPS data of that address. Such association could also be established due to the fact that the person was present at a scheduled meeting, travel or party, which was associated with the pictures.

In yet another example, dragging the activated entity "Things→Emails" to the time line 660 would show the Emails that were received and sent at the selected point in time. By dragging in addition an entity associated with a person to the time line, the list of Emails could be further restricted to the Emails that were sent to and received from that particular person.

In a further example, a user could identify the set of Emails that were exchanged with two particular people by dragging the two associated contact entities to the activated "Emails" entity. The two influencing contact entities would then restrict the set of associated entities displayed for the activated "Emails" entity.

In an example use case, there may be two informational entities "Jim" which is originally taken from a contact management software and "Emails" which is originally taken from an email client. As will be outlined in further detail below, various sources of information available on the computing system may be gathered from different applications and converged for the representation of the respective informational entity. As a consequence, each informational entity may be associated with different information. In particular, an information entity may be associated with other informational entities. By way of example, the informational entity "Jim" may have a set of informational entities associated with it, e.g. pictures from the "things" category of the person "Jim" stemming from a picture-organizing software, emails received or sent by the person "Jim", documents from a word-processor which comprise the name of the person "Jim". The informational entity "Emails" is typically associated with a set of emails, e.g. with all the emails stored on the computing system.

In more general terms, an informational entity of a first universal category (e.g. "people") may be associated with other informational entities of any of the (four) universal categories. This also applies for the time line 660. I.e. the informational entities may be associated with time instants or time stamps which indicate certain events or actions performed on the informational entity. By way of example, the time stamp may indicate when the informational entity was generated, i.e. when the picture was taken, when the emails was sent or received, and when the word-processing document was generated.

By dragging one or more informational entities in the vicinity or onto the time line 660, the informational entities may be automatically sorted in accordance to the associated time stamps. I.e. by dragging the entity "Emails" onto the time line 660, the emails may be sorted and displayed by their reception date. Furthermore, by dragging a further informational entity, e.g. the entity "Jim", into the vicinity or onto the time line, the activated entity "Emails" may be influenced in such a way that the displayed list of emails is restricted to the email messages which are associated with the entity "Jim". As a consequence, the restricted set of email messages is illustrated in an ordered fashion along the time line 660.

In other words, the time line 660 may not only be used to show the informational entities according to their time stamp, the time line 660 may also be used to generate sub-sets of entities presented along and within the timeline. The time line 660 will show the emails of the entity "Emails" only if the entity "Emails" is brought into the proximity of the time line 660. Furthermore, the time line 660 will show the informational entities which are associated with the entity "Jim" only if the entity, i.e. an electronic representation of the entity such as an icon or indicia, is brought onto or near to the time line 660. However, when both entities "Emails" and "Jim" are brought into the proximity of the time line 660, the time line 660 may show the cut-set of the informational entities, namely those that are associated to the entity "Jim" and to the entity "Emails". The time line 660 would then display the emails sent to or received from the person "Jim", but the time line 660 would not show entities which are outside the cut-set of the informational entities "Jim" and "emails", e.g. pictures where the person "Jim" occurs.

An alternative implementation might have dedicated areas on the display where to drop the informational entities to command the system to render a cut-set. In general, certain areas on the display, e.g. near the time line 660, may be used to perform predefined set operations, such as a cut set operation, a unification operation, etc. Various informational entities may be dragged to these areas in order to perform the respective set operation in conjunction with the other informational entities already dragged onto the time line 660. Indicia representing the set of entities which results from the set operations are displayed along the time line 660.

The user may want to view sub-sets of the respective entities. This will happen for example if the user wants to view all emails that he received from the person "Jim". First, the entity "emails" would be moved to the time line 660. Then, the representation of the entity "Jim" would be moved to the area on the time line 660 dedicated for "cut-set operations" and cause the time line 660 to make computations with the set of associated entities of "Emails". The cut set would only reveal entities that are associated to both entities, i.e. Emails mentioning Jim (received from, sent to, or just occurring in the subject or body text).

In general there are ample possibilities to generate sets or sub-sets of the entities associated with the selected entities. Among these are the unification and the cut set. In the above example, unification would reveal all entities belonging to the entity "Jim", "Emails" or both. Unification may also be involved when for example three people are involved in a project and exchange emails about a certain topic. In some cases, not every email may have been sent to every participant. Thus it may make sense to build a unification set of emails to retrieve all relevant emails.

The set operations may be further combined with thresholds. If for example the emails associated with the unification of N different entities from the category "people" are to be displayed along the time line 660, a certain threshold may be used to only display emails that are associated with at least n entities used for the unification. For example, the user may have ten people of a project unified and command the system to present emails that were sent to at least five people irrespective of what the exact persons were.

The different set operations may be implemented on different locations on the display and/or different icons onto which the user may place the informational entities which are to be subjected to the set operations. The user could generate a cut set of entities associated with selected entities by moving the selected entities to an area on the left of the screen and a union set by putting the selected entities to an area on the right. In another implementation, there may be icons where the informational entities may be moved to: one icon for building cut-sets, another icon for building unifications.

As outlined above, certain areas on or near the time line 660 may be dedicated to set operations on the selected entities. Other dedicated areas, e.g. on or near the time line 660, may be defined to display informational entities in parallel threads along the time line 660. This may be beneficial for providing a user with information on the timely co-incidence of informational entities. For example, the user may display the informational entities associated with the entity "Music" on one thread along the time line 660 and the entities associated with the entity "Emails" on a further thread along the time line 660. The user would then be able to easily find out what music he was listening to when he received a certain email.

It should be noted that the above mentioned set operations may be performed using an arbitrary number of influencing entities. By way of example, the informational entity "Jim" can be used to filter the associated entities of the entity "Pictures" displayed along the time line 660. The entity "Pictures" might be associated with all the pictures the user has stored on his system. Rendering the cut-set of "Pictures" and "Jim" would reveal only the pictures associated with Jim. Furthermore, the user could add a third entity to the cut-set operation, e.g. by adding a place such as "Berlin". This would leave only the pictures associated with "Jim" and "Berlin" to be displayed along the time line 660.

It should be noted that the user interface described in this document works independent of application domains and specific data types. In the examples described above, the data types "pictures", "emails", "contacts", "word-processing documents" and so forth are to be understood as examples for generic informational entities.

As outlined above, a preferred embodiment employs four universal data types or categories "People", "Things", "Places" and "Time". "Jim" might be associated to "People", "Pictures" and "Emails" might be associated to "Things" while "Berlin" might be associated to "Places". Thus, the user could retrieve "Things" such as pictures, emails, documents and music which are available on the computing device and which are related to the entity "Jim" by moving the entity "Things" to the time line 660. By putting the entity "Music", which is also associated to the entity or category "Things", to the timeline and building the cut-set with Jim, all music that is associated with the entity "Jim" may be obtained, e.g. music that the person "Jim" likes or music that was played during a joint meeting, for example a party. The same time line 660 may have been used to represent the standard calendar for organizing the party which was attended by the person "Jim". The entity "Jim" may have been added to the list of attendees of the party so that the software would be able to associate the music played during the party to all people that attending the party. Consequently, coinciding events or entities on the time line 660 may be associated automatically.

According to a further aspect the time line 660 may make use of a universal entity player that is capable of "playing" the informational entities which are displayed along the time line 660. If "Music" entities are displayed along the time line 660, then the music "entities" could be played back by the universal entity player in accordance to their appearance on the time line 660. As such, music which was played earlier on the time line 660 could be revisited and be played again. A more complex use case may involve the automatic displaying of all emails associated with Jim along the time line 660. The emails could be opened for a certain amount of time and after a predefined amount of time the next email on the time line 660 could be opened. Even more complex scenarios are feasible where the universal time line 660 may be able to show emails that were exchanged with friends to plan a holiday in "Berlin", then showing the pictures that were taken in "Berlin" while playing the music that was heard at that time. The retrieval of the above information would be straightforward for a user of the described user interface, as it would only require moving the entity "Berlin" to the time line 660. As a result, all entities, e.g. emails, pictures and music, associated with the entity "Berlin" would be displayed along the time line 660 and the user could simply navigate to the point in time on the time line 660 where the first event of the holiday occurred.

Figure 7:
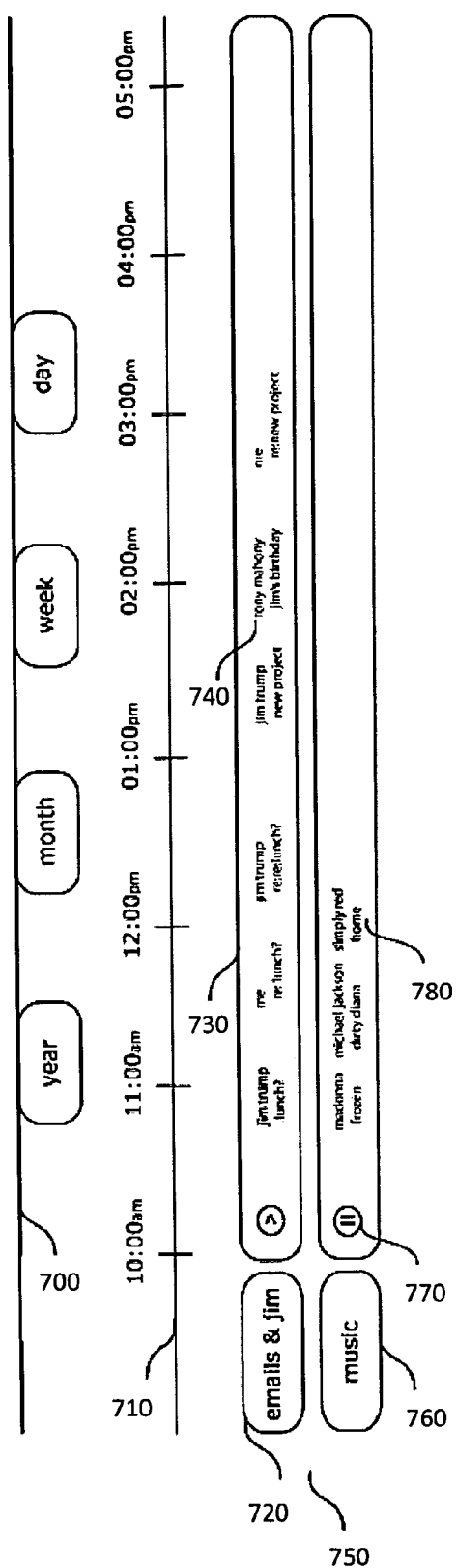
FIG. 7 illustrates an example of a user interface comprising a time line representation of informational entities.

An example user interface with a time line 710 having the above functionalities is illustrated in FIG. 7. The time line 710 comprises a menu or buttons 700 for changing the time resolution of the time line 710, e.g. a yearly, monthly, weekly or daily time resolution. In the illustrated example, the time line 710 shows the hours of a day. FIG. 7 illustrates two parallel threads along the time line 710. The first thread is defined by the set operation area 720 which indicates that the cut set of the entities "Emails" and "Jim" is depicted along the time line 710. The second thread is defined by the set operation area 760 which indicates that just one entity "music" is being depicted along the time line 710. The set operation areas 720, 760 may be implemented e.g. as pads, docks, icons or indicia. In general, it should be noted that a plurality of threads may be depicted in the zone 750 below the time line 710.

Thread 730 shows the resulting entities of the cut-set operation 720 along the time line 710. All "Email" entities which are associated with the entity "Jim" are shown at an associated time instant, e.g. at the time instant corresponding to the receipt or sending date of the email. By way of example, entity 740 corresponds to an email which mentions the name "Jim" in the subject field.

As outlined above, the threads on the time line 710 may comprise an entity player which is configured to render the depicted entities along the time line 710. Such an entity player 770 is shown in relation to the second thread (in the pause position) and it allows playing back the music files illustrated along the thread. Furthermore, a cursor 780 may be shown on the thread, wherein the cursor highlights the entity which is currently shown or played. In the illustrated example, the cursor 780 is indicated by the grey background of the entity.

These examples show that the present invention is applicable to a multitude of different data types such as pictures, emails, contacts and music. A multitude of data can be associated manually or automatically and then retrieved using one single user interface. This interface is extremely simple and intuitive, yet very powerful and allows for "data mining" one's personal data. All these different data types are represented by informational entities. All informational entities can have associations. The retrieval of associated entities depends on the physical distance of other informational entities and influences the ranking of the associated entities. Furthermore, the interface provides an intuitive means of retrieving and displaying associated entities along a time line and of performing set operations in support of the retrieval of associated entities.

The described methods may be implemented on computer systems, such as work stations, desktop PCs, laptops, tablet PCs, and handheld or wireless devices, such as mobile phones, smart phones, PDAs, etc. They could be used as user interfaces for the operating systems of such systems and devices and thereby facilitate the interaction between the user and the devices and allow for an intuitive, simple and fast retrieval of data from the memory of the device. As such, the described method is particularly useful for data-mining. Furthermore, the method could be implemented as a joint and common user interface for a plurality of software applications, such as Email applications, Calendar applications, Address book applications, Playlist applications, Picture book Applications, etc.

The present invention is not limited to the disclosed exemplary scenarios. Other use cases can benefit from the invention as well. This written description uses examples to disclose the invention, including the best mode, and also to enable any person skilled in the art to make and use the invention. While the invention has been described in terms of various specific embodiments, those skilled in the art will recognize that the invention can be practiced with modification within the spirit and scope of the claims. Especially, mutually non-exclusive features of the embodiments described above may be combined with each other. The patentable scope of the invention is defined by the claims, and may include other examples that occur to those skilled in the art.

The invention claimed is:

1. A user interface method executed on a processor for displaying, on a screen, indicia for a set of entities along a time line represented by a linear indicia, wherein an entity of the set of entities is associated with a time instant on the time line; the method comprising the steps of:
    displaying on the screen a first indicia for a first entity associated with a first set of entities;
    displaying on the screen a second indicia for a second entity associated with a second set of entities;

determining the distance on the screen between the first indicia and a set operation area displayed on the screen, the set operation area being associated with a set operation that can be applied to sets of entities;

determining the distance on the screen between the second indicia and the set operation area;

determining a third set of entities based on the determined distances and based on the set operation performed on the first and second set of entities; and displaying on the screen indicia for the third set of entities along the time line at time instants associated with the third set of entities.

2. The method of claim 1, wherein the set operation area is associated with a cut-set operation or an unification set operation.

3. The method of claim 1, wherein the step of determining the third set of entities comprises:

considering the first set of entities for the set operation if the distance on the screen between the first indicia and the set operation area is smaller than a threshold; and considering the second set of entities for the set operation if the distance on the screen between the second indicia and the set operation area is smaller than the threshold; and determining the third set of entities by performing the set operation on the considered sets of entities.

4. The method of claim 1, wherein the set operation area is associated with a cut-set operation and wherein the step of determining the third set of entities comprises:

selecting the first entity as an activated entity;

selecting the second entity as an influencing entity; and determining an entity of the third set of entities as an entity of the first set of entities which is associated with an entity of the second set of entities.

5. The method of claim 1, wherein the distance between an indicia and the set operation area is proportional to the geometric distance of the positions on the screen of the indicia of the entity and the set operation area.

6. The method of claim 1, further comprising:

displaying on the screen a fourth indicia for a fourth entity associated with a fourth set of entities;

determining the distance on the screen between the fourth indicia and a multiple thread area associated with the linear indicia;

displaying on the screen indicia for the fourth set of entities along the time line at time instants associated with the fourth set of entities.

7. The method of claim 6, wherein the indicia for the fourth set of entities are displayed in a separate time line thread than the indicia for the third set of entities.

8. The method of claim 7, wherein the separate time line thread is associated with a separate set operation area.

9. The method of claim 1, further comprising:

receiving a command for rendering the third set of entities;

sequentially rendering the entities of the third set of entities along the time line.

10. The method of claim 9, wherein content of an entity of the third set of entities is viewable, and wherein rendering comprises displaying the content of the entity; and/or content of an entity of the third set of entities is audible, and wherein rendering comprises playing back the content of the entity.

11. The method of claim 1, wherein the entities are organized in categories and at least one category is selected from one of: people, places, and things.

12. The method of claim 1, further comprising:

displaying an indicia for the set operation area.

13. A computing device configured for displaying indicia for a set of entities along a time line represented by a linear indicia, wherein an entity of the set of entities is associated with a time instant on the time line; the computing device comprising:

a screen for displaying a first indicia for a first entity associated with a first set of entities; and for displaying a second indicia for a second entity associated with a second set of entities;

processing means for determining the distance on the screen between the first indicia and a set operation area associated with a set operation; for determining the distance on the screen between the second indicia and the set operation area; and for determining a third set of entities based on the determined distances and based on the set operation performed on the first and second set of entities; and wherein the screen is further configured for displaying on the screen indicia for the third set of entities along the time line at time instants associated with the third set of entities.

14. The computing device of claim 13 comprising a storage unit for storing the entities and wherein an entity is at least one of contacts from a contact databank, places from a geographical databank, files from a file storage application, web sites from a web-browser application or emails from an Email application.

15. The computing device of claim 13 comprising an application module and wherein a function is applied on a selected entity by passing the entity to the application module.

* * * * *